United States Patent [19]

Barton

[11] 4,236,846

[45] Dec. 2, 1980

[54] TUBE JOINT

[75] Inventor: Peter Barton, Birmingham, England

[73] Assignee: B. C. Barton & Son Limited, West Midlands, England

[21] Appl. No.: 964,411

[22] Filed: Nov. 28, 1978

[30] Foreign Application Priority Data

Mar. 4, 1978 [GB] United Kingdom ............... 08705/78

[51] Int. Cl.[3] ............................................. F16B 7/00
[52] U.S. Cl. .................................................. 403/298
[58] Field of Search ........................ 403/297, 298, 362

[56] References Cited

U.S. PATENT DOCUMENTS

| | | | |
|---|---|---|---|
| 2,863,682 | 12/1958 | Canepa ............................ | 403/362 X |
| 3,000,656 | 9/1961 | Hollaender .......................... | 403/298 |
| 3,462,893 | 8/1969 | Kaiser .............................. | 403/297 X |
| 3,484,830 | 12/1969 | Wagner et al. .................. | 403/297 X |

*Primary Examiner*—James Kee Chi
*Attorney, Agent, or Firm*—Ladas & Parry

[57] ABSTRACT

A tube joint has a pair of tubes extending in different directions and connecting means for disposition between the tubes to connect them together. The connecting means has a pair of parts adapted to be juxtaposed so that a pair of spigot portions respectively on the parts from a spigot formation for fitting closely within one of the tubes extending in one direction. Abutment means on the parts limits insertion of the spigot formation into the tube and a lateral projection is provided on at least one of the parts to enable the other of the tubes to be secured thereto so as to extend in a different direction.

10 Claims, 8 Drawing Figures

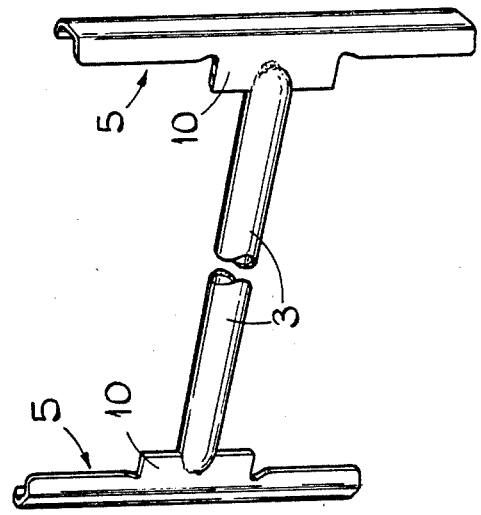
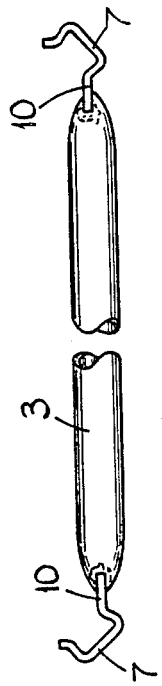
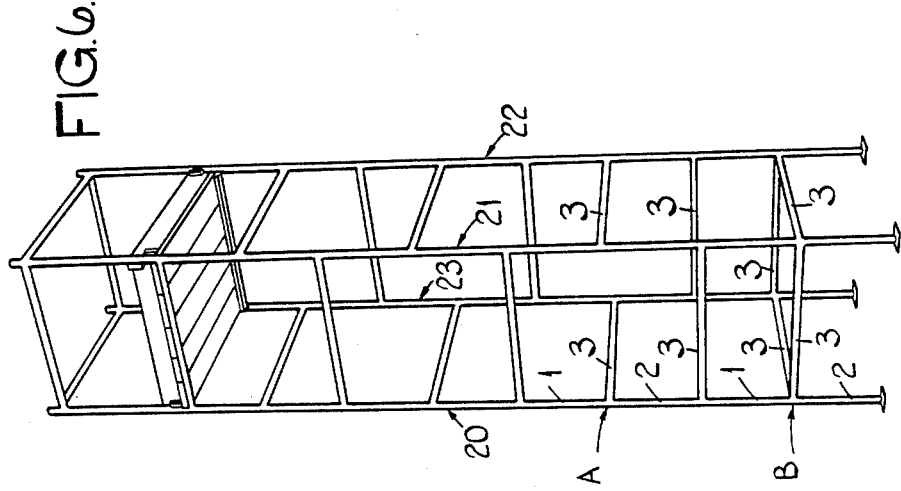

TUBE JOINT

This invention relates to a tube joint for connecting together tubes of any convenient cross-section to form structures such as scaffolding for example. The invention also embraces structures assembled by means of the aforesaid joint.

According to the invention, a tube joint comprises a pair of tubes extending in different directions, and connecting means for disposition between the tubes, the connecting means comprising a pair of parts adapted to be juxtaposed so that a pair of spigot portions respectively on said parts are disposed to form a spigot formation for fitting closely within one of said tubes extending in one direction, abutment means on the parts to limit the insertion of the spigot formation into the tube, and a lateral projection on at least one of the parts for securing thereto the other of said tubes extending in a different direction.

The invention will now be described, by way of example, with reference to the accompanying drawings in which:

FIG. 6 is a perspective view of a scaffolding tower constructed using the joint of the invention;

FIG. 7 is a detail of a transom for use in a scaffolding and including a joint component at either end thereof; and FIG. 8 is a scrap view of one end of the transom of FIG. 7 to an enlarged scale.

Figure 1:
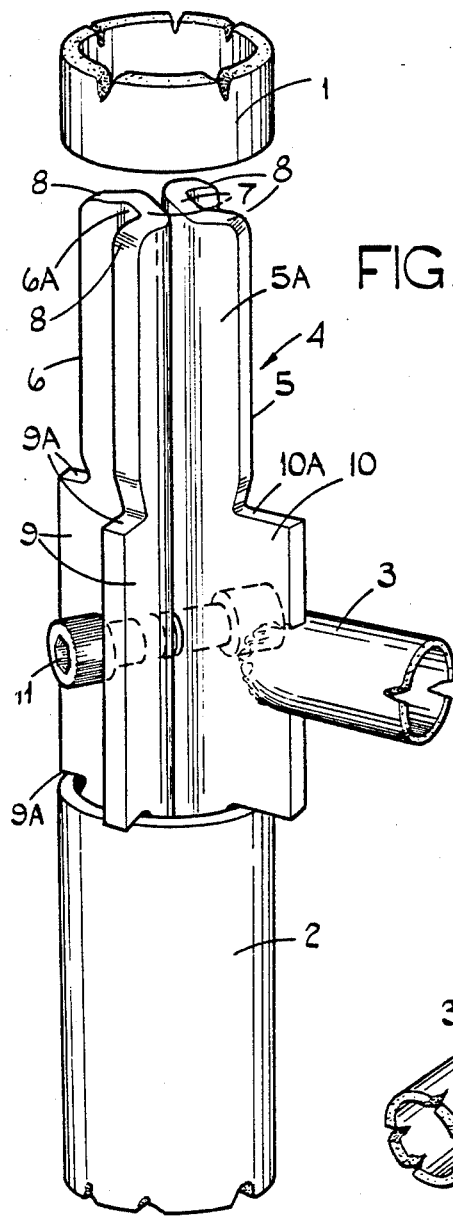
FIG. 1 is a perspective view of one form of the joint of the invention.
Figure 4:
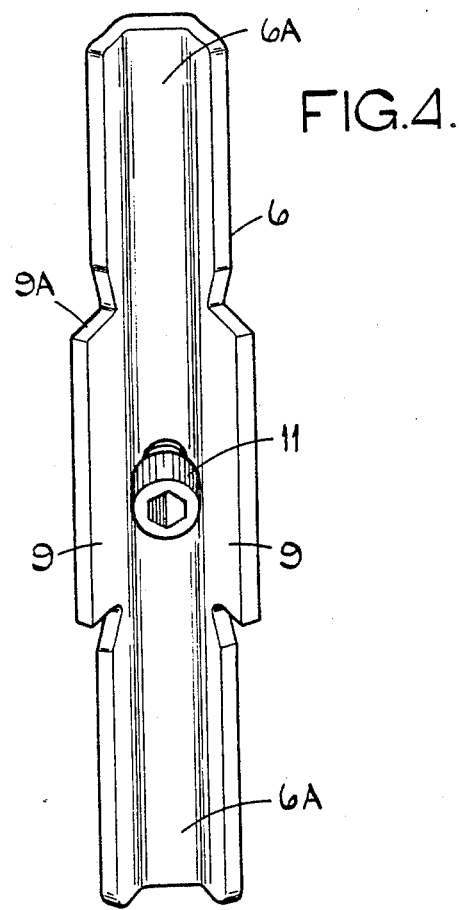
FIG. 4 is an elevation of a component used in the joint of FIG. 1.

Referring first to FIG. 1 of the drawings, this shows one of the simplest forms of the joint of the invention which includes a pair of vertical cylindrical scaffolding tubes 1 and 2 connected together and to a horizontal scaffolding tube or transom 3 by connecting means indicated generally at 4. The connecting means includes a pair of parts 5 and 6 which may conveniently be made by a pressing operation. Each part 5 and 6 includes a flat face 7 and a pair of inclined wings 8 projecting respectively from the longitudinal edges of the base and extending over the whole length thereof. As will be seen from FIGS. 4 and 5, each of the parts 5 and 6 has a pair of oppositely extending spigot portions 5A and 6A shown, in this case, of equal length. The length and inclination of the wings 8 is chosen so that when the parts 5 and 6 are placed together back-to-back as illustrated, the adjacent pairs of spigot portions 5A, 6A together provide spigot-formations for engagement in the tubes 1 and 2, the outermost extremities of the wings being then disposed so that the outermost extremities of the wings lie closely adjacent to or engage the internal surface of the tube.

The wings of the parts 6 are provided with generally centrally disposed projecting tongues 9 which lie respectively in the same planes as the wings 8 and the upper and lower edges 9A of which form shoulders for abutment with the end surfaces of the tubes 1 and 2, as will be seen from FIG. 1. The part 5 has one tongue 9 which is identical with the tongues 9 of the part 6 and another tongue 10 which is disposed in similar manner to the tongues 9 but which projects from the associated tongue 8 by a greater distance than the tongues 9. The upper and lower edges 9A and 10A respectively of the tongues 9 and 10 of the part 5 again provide shoulders for abutment with the end surfaces of the tubes 1 and 2. The particular arrangement of tongues of the parts 5 and 6 is more clearly illustrated in FIGS. 4 and 5.

As will be seen from FIG. 1, a normally horizontal tube or transom 3 is slotted at one end portion thereof to receive the tongue 10 and the transom is secured to the tongue by convenient means such as welding for example. In practice, and as will be seen more clearly from FIG. 7, the transom 3 normally has a pair of parts 5 secured thereto at respective tongues 10, thereby to provide a convenient transom unit for use in the construction of scaffolding, for example, as will be described hereinafter. Each of the parts 5 and 6 is provided with locking means shown as respective screws 11, the screws being so arranged that, with the parts assembled to form a joint as shown in FIG. 1, the screws are in alignment and extend in opposite directions. Upon being screwed in the appropriate direction, they thus react one on the other and tend to push the parts 5 and 6 away from each other. Thus, with the parts engaged within tubes 1 and 2, the screws may be operated so as effectively to expand the connecting means consisting of the parts 5 and 6 tightly into engagement with the inner surfaces of the tubes so as frictionally to lock the joint in its assembled condition.

The joint of the invention may conveniently be used in the joining together of tubes to form various structures such as the scaffolding illustrated in FIG. 6. In this particular scaffolding four uprights are provided and designated generally by 20, 21, 22 and 23. At some locations, the uprights are joined together by four transoms 3 and at other locations, by only two transoms 3. At these latter locations, the transoms 3 are arranged in opposed pairs so that alternate pairs along the lengths of the uprights are mutually perpendicularly disposed. The joint of FIG. 1 is used at a location such as that indicated at A in FIG. 6 where a connection is to be formed between portions 1 and 2 of the upright 20, for example, and an end of the transom 3. In this case, only one extended tongue 10 is required for connection of the transom 3, the remaining tongues being the shorter tongues 9. This arrangement provides a neat appearance, since no extraneous tongues extend by more than in insignificant amount and the generally straight appearance of the upright 20 is thus preserved.

Figure 2:
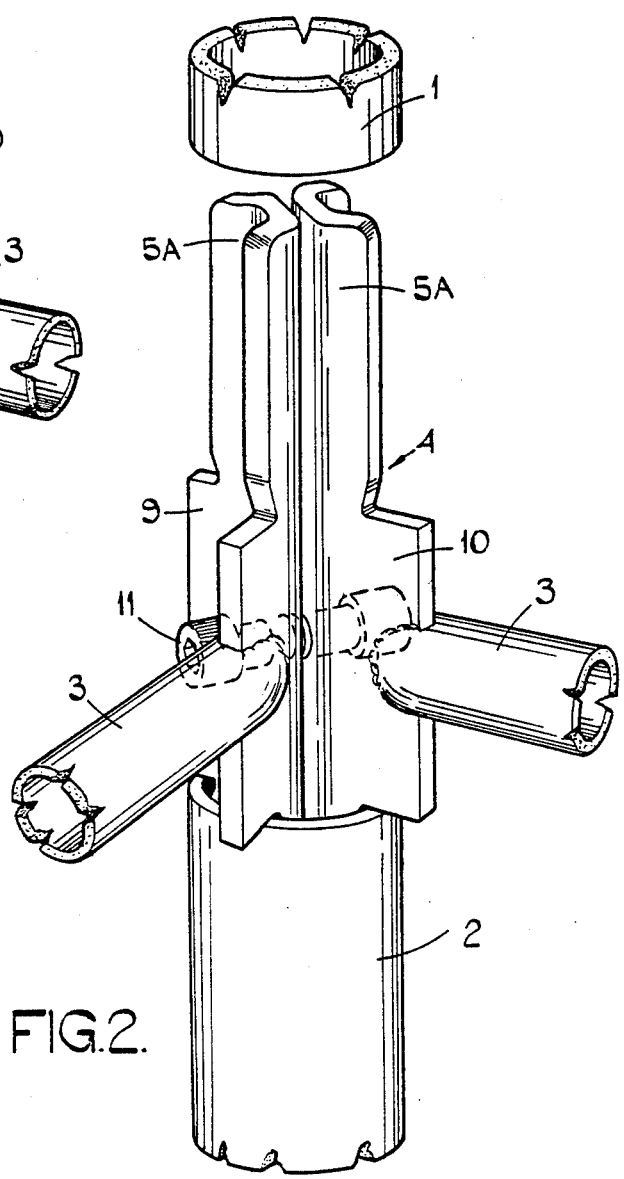
FIG. 2 is a view similar to FIG. 1 showing an alternative form of the joint of the invention.
Figure 5:
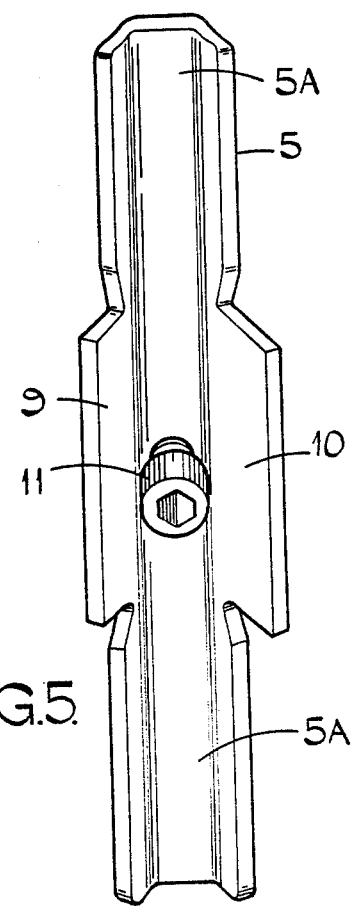
FIG. 5 is a component used in the joints of FIGS. 1 to 3.

FIG. 2 illustrates an alternative form of joint of the invention which differs from the joint of FIG. 1 only in that both of the parts 5 and 6 are of the kind shown in FIG. 5, each having a longer tongue 10 and a shorter tongue 9. As indicated in FIG. 8 each tongue 10 is inclined with respect to the base 7 by 45° so that when, in use, the parts are disposed back-to-back with their bases in engagement the included angle between the tongues and consequently between transoms 3 secured to the tongues is a right angle. This embodiment of the joint of the invention is thus suitable for use in a location in the scaffolding of FIG. 6 such as that indicated at B, where a connection between two transoms 3 at right angles is required. The joint of FIG. 2 is locked in position within the uprights 1 and 2 by opposed screws 11 as described in connection with FIG. 1.

Figure 3:
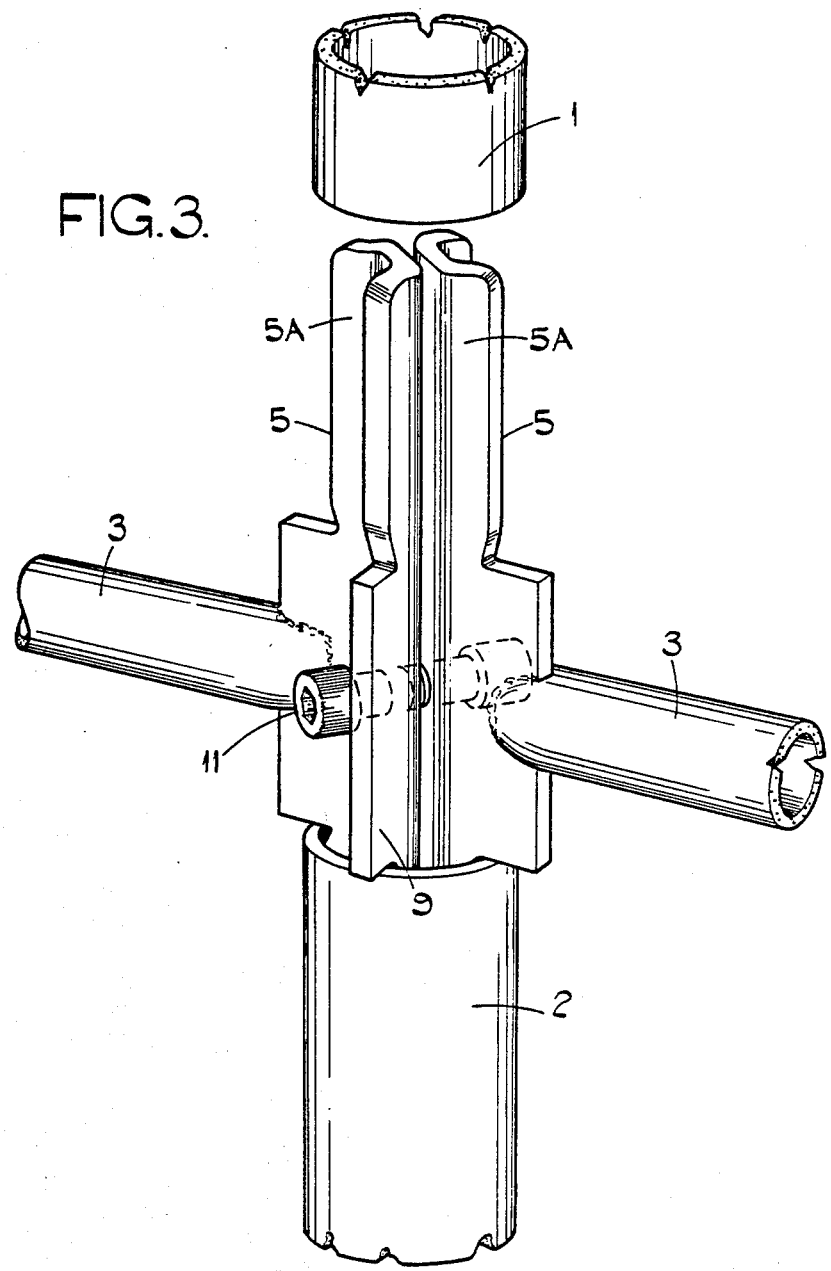
FIG. 3 is a view similar to FIGS. 1 and 2 showing a further alternative form of the joint of the invention.

It is also possible to use the joint of the invention to connect upright tubes 1 and 2 to a pair of transoms 3 arranged in alignment one with the other as shown in FIG. 3. This can be achieved by displacing the two parts 5 of the connecting means with respect to each other by 180°, so that the long tongues 10 instead of being disposed at right angles, extend in the same plane. Locking is again effected by means of opposed screws 11 in the parts 5 and 6.

It will be appreciated that the parts 5 and 6 of the connecting means need not necessarily be of the exact cross-section shown in the drawings. For example, the portion comprising the base 7 and wings 8 may form a continuous curve and the tongues 9 and 10 may be of any desired shape consistent with their function of providing abutment shoulders 9A for the upright tubes 1 and 2 and, in the case of the longer tongues 10, of providing means to which the transoms 3 may be secured. The screws 11, although shown and described as being in opposed relationship so as to react one against the other, may alternatively be located in positions which are relatively displaced lengthwise of the connecting means so that the screw on one part of the connecting means reacts directly against the other part of the connecting means. The tubes 1 and 2 and transoms 3 may be of any convenient cross-section and the joint of the invention may be employed to produce a variety of constructions by joining together various combinations of upright tubes and transoms.

It would be possible to omit those portions of the connecting parts 5 and 6 which, in use, would normally extend upwardly of the tongues 9 and 10, and with a connecting means of this nature it would be possible to use the arrangement of FIG. 2 to provide a rectangular enclosure, possibly in combination with the arrangement of FIG. 3 which would enable transoms to be joined together in line to enable the sides of the rectangle to be extended to any desired length. Again, using the arrangement of FIG. 3, a straight barrier or the like could be constructed. At the ends of the barrier, where only a single connection to a transom 3 would be required, one of the parts 5 would be replaced by a part 6 having a pair of short tongues.

What is claimed is:

1. A tube joint comprising a pair of tubes extending in different directions, and connecting means for disposition between the tubes, the connecting means comprising:

a pair of generally plate-like parts each having a base portion and at least one longitudinally extending wing projecting from the base portion, each wing having an end portion extending from one end of the base portion towards the other end thereof and at least one of the wings also having a lateral projection extending laterally beyond said end portion and disposed between said end portion and said other end of the base portion, said parts being adapted to be disposed with the base portions in juxtaposed back-to-back relationship, in which disposition the end portions of the respective wings form a spigot formation for fitting closely within one of said tubes extending in one direction while the lateral projection lies outside said one tube, disposed for having the other of said tubes, extending in a different direction from said one tube, secured thereto;

abutment means on the parts to limit the insertion of the spigot formation into said one tube; and a locking screw on each of said parts, the locking screws on the two parts being arranged so as to be in alignment when the parts are disposed so that the spigot formation is formed, whereby the locking screws may be screwed against one another in use to urge the respective end portions of said parts outwardly into frictional locking engagement with the interior surface of said one tube.

2. A tube joint according to claim 1, wherein said parts are of generally curved cross-section.

3. A tube joint according to claim 1 or claim 2, wherein each of said parts has two longitudinally extending wings projecting from the base portion in mutually diverging relationship.

4. A tube joint according to claim 1, wherein each of said parts has a lateral projection extending laterally beyond the end portion of at least one wing of said part.

5. A tube joint according to claim 1, wherein with the lateral projection there is paired a further shorter lateral projection extending generally oppositely to and diverging from the other projection of the pair.

6. A tube joint according to claim 1, wherein said lateral projection is paired with a shorter lateral projection extending generally oppositely to and diverging from the other projection of the pair, and the other part of the pair has a pair of generally oppositely disposed divergent lateral projections of shorter outward extent than that lateral projection on said one part to which said other of the tubes is to be secured.

7. A tube joint according to claim 1, wherein said abutment means include that edge of said lateral projection which is nearer to said one end of the base portion of that part which is provided with said lateral projection.

8. A tube joint according to claim 5, wherein said other of the tubes is secured at one end thereof to a lateral projection of one of the parts and at the other end thereof to a lateral projection of another part for inclusion in a further tube joint.

9. A tube joint according to claim 1, wherein said parts each have two oppositely extending end portions arranged so that when the parts are disposed with the base portions in juxtaposed back-to-back relationship said end portions form a pair of oppositely extending spigot formations for fitting closely within a pair of oppositely extending tubes.

10. A structure formed by the use of tube joints according to claim 1.

* * * * *